US012515651B2

(12) United States Patent
Kim et al.

(10) Patent No.: US 12,515,651 B2
(45) Date of Patent: Jan. 6, 2026

(54) SYSTEM AND METHOD FOR TARGET BEHAVIOR PREDICTION USING HOST PREDICTION IN ADVANCED DRIVING ASSIST SYSTEM (ADAS), AUTONOMOUS DRIVING (AD), OR OTHER APPLICATIONS

(71) Applicant: Canoo Technologies Inc., Torrance, CA (US)

(72) Inventors: Kilsoo Kim, Hermosa Beach, CA (US); Jongmoo Choi, Gardena, CA (US); Shanmukha M. Bhumireddy, Torrance, CA (US); Emilio Aron Moyers Barrera, Bloomfield Hills, MI (US); Phillip Vu, Calabasas, CA (US); Rishitha Kalakata, Torrance, CA (US)

(73) Assignee: CANOO TECHNOLOGIES INC., Torrance, CA (US)

( * ) Notice: Subject to any disclaimer, the term of this patent is extended or adjusted under 35 U.S.C. 154(b) by 136 days.

(21) Appl. No.: 18/052,122

(22) Filed: Nov. 2, 2022

(65) Prior Publication Data
US 2024/0140413 A1    May 2, 2024

(51) Int. Cl.
| | | |
|---|---|---|
| *B60W 30/095* | (2012.01) | |
| *B60W 30/09* | (2012.01) | |
| *B60W 50/16* | (2020.01) | |

(52) U.S. Cl.
CPC ........ *B60W 30/0956* (2013.01); *B60W 30/09* (2013.01); *B60W 50/16* (2013.01);
(Continued)

(58) Field of Classification Search
CPC .. B60W 30/0956; B60W 30/09; B60W 50/16; B60W 2554/4041; B60W 2554/4046
See application file for complete search history.

(56) References Cited

U.S. PATENT DOCUMENTS

| | | | |
|---|---|---|---|
| 5,638,281 A | 6/1997 | Wang | |
| 2005/0225477 A1* | 10/2005 | Cong | ................. B60K 31/0083 342/72 |

(Continued)

FOREIGN PATENT DOCUMENTS

| | | |
|---|---|---|
| CA | 2884808 C | 5/2019 |
| GB | 2597264 A | 1/2022 |
| WO | 2021020311 A1 | 2/2021 |

OTHER PUBLICATIONS

Kim et al., "Vehicle Motion Control Using Torque Vectoring With Consideration Of Driver Intent And Load Transfer," U.S. Appl. No. 17/935,632, filed Sep. 27, 2022, 48 pages.
(Continued)

*Primary Examiner* — Kyle J Kingsland
(74) *Attorney, Agent, or Firm* — ALLEN, DYER, DOPPELT, GILCHRIST, P.A.

(57) ABSTRACT

A method includes obtaining sensor data associated with a target object at a host vehicle and generating at least one first polynomial associated with the host vehicle. Each first polynomial is a representation of an estimated behavior of the host vehicle. The method also includes identifying relative positions of the target object over time and generating at least one second polynomial associated with the target object based on the relative positions. Coefficients of each second polynomial are based on a magnitude of a covariance of the relative positions used to generate the second polynomial. Each second polynomial is a representation of an estimated behavior of the target object. The method further includes determining whether a collision between the host vehicle and the target object is possible based on the first and second polynomials and, in response to determining that the collision is possible, initiating one or more corrective actions.

24 Claims, 9 Drawing Sheets

(52) U.S. Cl.
CPC ............... *B60W 2554/4041* (2020.02); *B60W 2554/4046* (2020.02)

(56) References Cited

U.S. PATENT DOCUMENTS

| | | | |
|---|---|---|---|
| 2009/0192710 | A1 | 7/2009 | Eidehall et al. |
| 2011/0071731 | A1 | 3/2011 | Eidehall et al. |
| 2018/0251092 | A1 | 9/2018 | Lee et al. |
| 2018/0257660 | A1 | 9/2018 | Ibrahim et al. |
| 2018/0293893 | A1 | 10/2018 | Yang et al. |
| 2019/0193275 | A1 | 6/2019 | Tan et al. |
| 2020/0043186 | A1 | 2/2020 | Selviah et al. |
| 2020/0049511 | A1 | 2/2020 | Sithiravel et al. |
| 2021/0053560 | A1 | 2/2021 | Haddad et al. |
| 2021/0272466 | A1 | 9/2021 | Ahn |
| 2023/0089978 | A1* | 3/2023 | Pulver .................. G05D 1/0238 701/26 |
| 2023/0103248 | A1* | 3/2023 | Abrash ............. B60W 60/0027 701/26 |
| 2023/0331218 | A1 | 10/2023 | Choi et al. |
| 2023/0347882 | A1* | 11/2023 | Tian .................. B60W 30/0956 |
| 2024/0010232 | A1 | 1/2024 | Karkus et al. |
| 2024/0059285 | A1 | 2/2024 | Ng et al. |

OTHER PUBLICATIONS

Choi et al., "Proximity Detection For Automotive Vehicles and Other Systems Based On Probabilistic Computing Techniques," U.S. Appl. No. 17/366,866, filed Jul. 2, 2021, 35 pages.

Kim et al., "System And Method In Vehicle Path Prediction Based On Odometry And Inertial Measurement Unit," U.S. Appl. No. 17/449,623, filed Sep. 30, 2021, 40 pages.

Kim et al., "System And Method For Target Behavior Prediction In Advanced Driving Assist System (ADAS), Autonomous Driving (AD), Or Other Applications," U.S. Appl. No. 18/052,124, filed Nov. 2, 2022, 39 pages.

International Search Report and Written Opinion of the International Searching Authority dated Oct. 19, 2022 in connection with International Patent Application No. PCT/US22/32523, 7 pages.

Ahangar, "Introduction to Statistical Geometry," Proceedings of the 2010 International Conference on Scientific Computing, Jul. 2010, 6 pages.

Ahangar, "Harmonic Probability Density Function, Modeling, and Regression," European International Journal of Science and Technology, vol. 2, No. 5, Jun. 2013, 9 pages.

Maesschalck et al., "The Mahalanobis distance," Chemometrics and Intelligent Laboratory System, vol. 50, 2000, 18 bages.

Mahalanobis, "On the Generalized Distance in Statistics," vol. II, No. 1, Apr. 1936, 7 pages.

Schweppe, "On the Bhattacharyya Distance and the Divergence between Gaussian Processes," Information and Control, vol. 11, 1967, 23 pages.

International Search Report and Written Opinion of the International Searching Authority dated Nov. 3, 2023, in connection with International Application No. PCT/US2023/028979, 14 pages.

Brunton et al., "Supporting Information for: Discovering governing equations from data: Sparse identification of nonlinear dynamical systems," Mar. 2016, Proceedings of the National Academy of Sciences of the United States of America, 76 pages.

International Search Report and Written Opinion of the International Searching Authority dated Nov. 13, 2023, in connection with International Application No. PCT/US2023/071210, 8 pages.

Non-Final Office Action issued Jul. 26, 2024, in connection with U.S. Appl. No. 18/052,124, 9 pages.

\* cited by examiner

SYSTEM AND METHOD FOR TARGET BEHAVIOR PREDICTION USING HOST PREDICTION IN ADVANCED DRIVING ASSIST SYSTEM (ADAS), AUTONOMOUS DRIVING (AD), OR OTHER APPLICATIONS

TECHNICAL FIELD

This disclosure relates generally to prediction systems. More specifically, this disclosure relates to a system and method for target behavior prediction using host prediction in advanced driving assist system (ADAS), autonomous driving (AD), or other applications.

BACKGROUND

Various automotive applications have been developed that process input data from sensors or other sources and control operations of vehicles based on the input data. For example, in an advanced driving assist system (ADAS) or autonomous driving (AD) application, information from one or more sensors (such as one or more cameras) can be processed in order to identify objects (such as other vehicles) around a specific vehicle (often referred to as an "ego vehicle"). The identified objects may then be used for control purposes or other purposes, such as to adjust the speed or direction of travel of the ego vehicle or to alert an operator of the ego vehicle.

SUMMARY

This disclosure relates to a system and method for target behavior prediction using host prediction in advanced driving assist system (ADAS), autonomous driving (AD), or other applications.

In a first embodiment, a method includes obtaining sensor data associated with a target object at a host vehicle and generating at least one first polynomial associated with the host vehicle, where each first polynomial is a representation of an estimated behavior of the host vehicle. The method also includes identifying relative positions of the target object with reference to the host vehicle over time and generating at least one second polynomial associated with the target object based on the relative positions of the target object. Coefficients of each second polynomial are based on a magnitude of a covariance of the relative positions of the target object used to generate the second polynomial, and each second polynomial is a representation of an estimated behavior of the target object. The method further includes determining whether a collision between the host vehicle and the target object is possible based on the first and second polynomials and, in response to determining that the collision between the host vehicle and the target object is possible, initiating one or more corrective actions by the host vehicle.

In a second embodiment, an apparatus includes at least one processing device configured to obtain sensor data associated with a target object at a host vehicle and generate at least one first polynomial associated with the host vehicle, where each first polynomial is a representation of an estimated behavior of the host vehicle. The at least one processing device is also configured to identify relative positions of the target object with reference to the host vehicle over time and generate at least one second polynomial associated with the target object based on the relative positions of the target object. Coefficients of each second polynomial are based on a magnitude of a covariance of the relative positions of the target object used to generate the second polynomial, and each second polynomial is a representation of an estimated behavior of the target object. The at least one processing device is further configured to determine whether a collision between the host vehicle and the target object is possible based on the first and second polynomials and, in response to determining that the collision between the host vehicle and the target object is possible, initiate one or more corrective actions by the host vehicle.

In a third embodiment, a non-transitory machine-readable medium contains instructions that when executed cause at least one processing device of a host vehicle to obtain sensor data associated with a target object and generate at least one first polynomial associated with the host vehicle, where each first polynomial is a representation of an estimated behavior of the host vehicle. The non-transitory machine-readable medium also contains instructions that when executed cause the at least one processing device to identify relative positions of the target object with reference to the host vehicle over time and generate at least one second polynomial associated with the target object based on the relative positions of the target object. Coefficients of each second polynomial are based on a magnitude of a covariance of the relative positions of the target object used to generate the second polynomial, and each second polynomial is a representation of an estimated behavior of the target object. The non-transitory machine-readable medium further contains instructions that when executed cause the at least one processing device to determine whether a collision between the host vehicle and the target object is possible based on the first and second polynomials and, in response to determining that the collision between the host vehicle and the target object is possible, initiate one or more corrective actions by the host vehicle.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
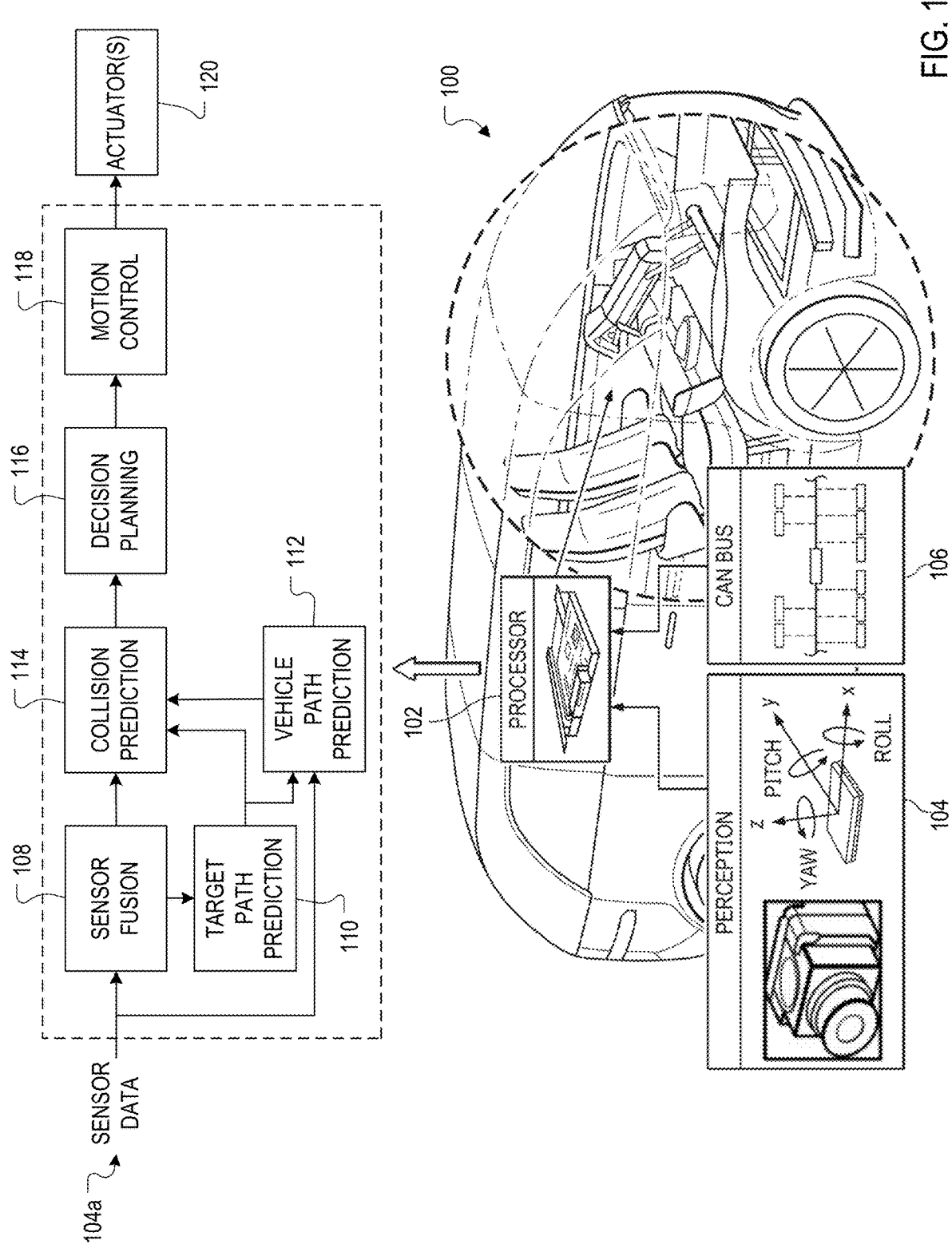
FIG. 1 illustrates an example system supporting target behavior prediction according to this disclosure.

FIGS. 1 through 11, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, various automotive applications have been developed that process input data from sensors or other sources and control operations of vehicles based on the input data. For example, in an advanced driving assist system (ADAS) or autonomous driving (AD) application, information from one or more sensors (such as one or more cameras) can be processed in order to identify objects (such as other vehicles) around a specific vehicle (often referred to as an "ego vehicle"). The identified objects may then be used for control purposes or other purposes, such as to adjust the speed or direction of travel of the ego vehicle or to alert an operator of the ego vehicle.

As a particular example of this, target behavior prediction generally involves identifying target objects around an ego vehicle and predicting how the target objects may behave in the future, such as by predicting how the target objects may move relative to the ego vehicle in the future. Accurate target behavior prediction may be extremely useful or important in a number of applications, such as in ADAS and AD applications where the control of an ego vehicle can depend heavily on predicted behaviors of vehicles or other objects around the ego vehicle. Unfortunately, real-world conditions are highly variable, and it can be difficult to perform target behavior prediction effectively across a wide range of real-world conditions.

This disclosure provides various techniques for performing target behavior prediction. As described in more detail below, an ADAS/AD system or other system can be used to identify positions of a target object relative to an ego vehicle over time. This information represents tracking information, and the tracking information can be used along with covariance information and optionally a prediction about the path of the ego vehicle in order to generate a polynomial associated with an estimated path of the target object. A polynomial representing an estimated path of the ego vehicle may also be determined. This can be repeated over time as the ego vehicle continues its travel and as additional positions of the target object relative to the ego vehicle are obtained. This process can also be performed for each target object. As a result, multiple polynomials associated with the ego vehicle and multiple polynomials associated with each target object can be generated over time.

Collision prediction can be performed based on the generated polynomials. For example, an individual polynomial associated with the ego vehicle or each target object can be used as the current representation of the estimated behavior of the ego vehicle or the target object, or a weighted sum of multiple polynomials associated with the ego vehicle or the same target object can be determined and used as a current representation of the estimated behavior of the ego vehicle or the target object. Based on the current representations of the estimated behaviors of the ego vehicle and each target object, the system can determine whether a collision between the ego vehicle and any target object is probable or likely. If the probability of a collision exceeds a threshold or if a collision is otherwise probable or likely to occur, corrective action can occur. This may include controlling the ego vehicle's steering system to change a course or path of the ego vehicle's travel. This may also or alternatively include controlling the ego vehicle's motor(s) or braking system(s) to change the speed or acceleration of the ego vehicle.

Note that this type of process may occur for each of multiple target objects, such as for each target object detected around or near the ego vehicle. By using the covariance information, the multiple polynomials, and the predictions about the path of the ego vehicle here, it is possible to deal with varying scenarios that may be experienced by the ego vehicle. This may include (i) situations where the target object has a generally steady motion relative to the ego vehicle and (ii) situations where the target object has a generally non-steady motion relative to the ego vehicle.

FIG. 1 illustrates an example system 100 supporting target behavior prediction according to this disclosure. In this particular example, the system 100 takes the form of an automotive vehicle, such as an electric vehicle. As a result, the system 100 may also be referred to as a vehicle 100. However, any other suitable system may support the use of target behavior prediction, such as other types of vehicles, autonomous robots, or other autonomous or non-autonomous systems.

As shown in FIG. 1, the vehicle 100 includes at least one processor 102 configured to control one or more operations of the vehicle 100. In this example, the processor 102 may interact with one or more perceptual or other sensors 104 and with one or more components coupled to a bus 106. In this particular example, the one or more sensors 104 include at least one camera and at least one inertial measurement unit (IMU), and the bus 106 represents a controller area network (CAN) bus. The at least one camera may represent any suitable imaging sensor(s), such as one or more visible, infrared, or other cameras. However, the processor 102 may interact with any other or additional sensor(s) and communicate over any other or additional bus(es). For instance, other or additional types of sensors 104 that may be used here can include one or more radio detection and ranging (RADAR) sensors, light detection and ranging (LIDAR) sensors, or other types of sensors. In general, any suitable type(s) of sensor(s) 104 may be used to collect information for processing by the vehicle 100, and this disclosure is not limited to any specific type(s) of sensor(s) 104.

Measurements and/or other sensor data 104a from the sensors 104 are used by the processor 102 or other component(s) to perform target behavior prediction. In this example, the processor 102 performs a sensor fusion function 108, which generally operates to combine sensor data 104a from different sensors 104. For example, the sensor fusion function 108 may identify estimated locations or other information about objects detected using images or other data from multiple sensors 104, and the sensor fusion function 108 may combine sensor data 104a from different sensors 104 and/or information derived based on sensor data 104a from different sensors 104 for each detected object. The sensor fusion function 108 may combine sensor data 104a from different sensors 104 and/or information derived based on sensor data 104a from different sensors 104 in any suitable manner as needed or desired.

The combined sensor information is provided to a target path prediction function 110, which generally operates to estimate the behavior(s) of one or more detected target objects, such as one or more target objects around or near the vehicle 100. For example, the target path prediction function 110 can identify positions of a target object relative to the vehicle 100 over a period of time. These positions are used as tracking information, and the target path prediction function 110 can use the tracking information along with covariance information and optionally a prediction about the path of the vehicle 100 in order to generate a polynomial. The polynomial represents a curve that is fit to the tracking information in order to represent both actual prior locations of the target object and estimated future locations of the target object. The target path prediction function 110 can repeat this process over time as more positions of the target object relative to the vehicle 100 are received, which leads to the generation of multiple polynomials for the target object. The target path prediction function 110 can also perform this process for each of multiple target objects, such as to generate polynomials for multiple target objects around or near the vehicle 100. Example details of the operations of the target path prediction function 110 are provided below.

At least some of the sensor data 104a is also provided to a vehicle path prediction function 112, which generally operates to estimate the predicted future path of the vehicle 100. For example, the vehicle path prediction function 112 may use sensor data such as speed and acceleration/deceleration measurements from an IMU and wheel odometry information from one or more wheel sensors to estimate the future path of the vehicle 100. This information can be used to generate a polynomial, which represents a curve identifying the expected future path of the vehicle 100 based on the various characteristics of the vehicle 100. The vehicle path prediction function 112 can repeat this process over time as operation of the vehicle 100 continues, such as when the speed, acceleration/deceleration, or steering direction of the vehicle 100 changes. The predicted path of the vehicle 100 may be used by the target path prediction function 110 when generating at least some of the polynomials for one or more target objects. Example details of the operations of the vehicle path prediction function 112 are provided below.

The combined sensor information and the generated polynomials for each target object and the vehicle 100 are provided to a collision prediction function 114, which generally operates to estimate whether a collision between the vehicle 100 and any target object is probable or likely. For example, the collision prediction function 114 may determine whether any polynomials for a target object intersect the polynomial representing the estimated travel path of the vehicle 100. In some embodiments, the collision prediction function 114 may generate, for each target object and/or for the vehicle 100, a weighted sum of the polynomials for that target object or the vehicle 100. The weighted sum of the polynomials for a target object or the vehicle 100 can be used as a current representation of the estimated behavior of that target object or the vehicle 100, and the collision prediction function 114 may determine whether a collision is probable or likely using the weighted combination(s) of polynomials. In some cases, the collision prediction function 114 can determine a probability of collision for each target object and compare each probability to a threshold in order to determine if a collision with that target object is probable or likely to occur. Example details of the operations of the collision prediction function 114 are provided below.

A decision planning function 116 generally uses various information, including an indication of whether a collision is or is not probable or likely to occur, to determine how to adjust the operation of the vehicle 100. For example, in an automotive vehicle, the decision planning function 116 may determine whether (and how) to change the steering or travel direction of the vehicle 100, whether (and how) to apply the brakes or accelerate the vehicle 100, or whether (and how) to trigger an audible, visible, haptic, or other warning. The warning may indicate that the vehicle 100 is near another vehicle, obstacle, or person, is departing from a current lane in which the vehicle 100 is traveling, or is approaching a possible impact location with another vehicle, obstacle, or person. In general, the identified adjustments determined by the decision planning function 116 can vary widely based on the specific application.

The decision planning function 116 can interact with a motion control function 118, which generally uses various information to determine how to actually adjust the operation of the vehicle 100 so that the vehicle 100 alters its path, speed, or other operational characteristic(s). For example, the motion control function 118 may determine one or more actions to be taken in order to avoid a collision with a target object. In order to actually implement changes to the operation of the vehicle 100, the motion control function 118 can be used to adjust or control the operation of one or more actuators 120 in the vehicle 100. In some cases, the one or more actuators 120 may represent one or more electric motors, brakes, regenerative braking systems, or other controls that can be used to adjust the speed or acceleration/deceleration of the vehicle 100. In other cases, the one or more actuators 120 may represent one or more steering controls, torque vectoring controls, or other controls that can be used to adjust the travel direction of the vehicle 100. A combination of these controls may also be used. Note, however, that the specific ways in which the operations of the vehicle 100 can vary depend on the specific vehicle 100 being used.

The functions 108-118 shown in FIG. 1 and described above may be implemented in any suitable manner in the vehicle 100. For example, in some embodiments, various functions 108-118 may be implemented or supported using one or more software applications or other software instructions that are executed by at least one processor 102. In other embodiments, at least some of the functions 108-118 can be implemented or supported using dedicated hardware components. In general, the functions 108-118 described above may be performed using any suitable hardware or any suitable combination of hardware and software/firmware instructions.

The processor 102 itself may also be implemented in any suitable manner, and the vehicle 100 may include any suitable number(s) and type(s) of processors or other processing devices in any suitable arrangement. Example types of processors 102 that may be used here include one or more microprocessors, microcontrollers, digital signal processors (DSPs), application specific integrated circuits (ASICs), field programmable gate arrays (FPGAs), or discrete circuitry. Each processor 102 may also have any suitable number of processing cores or engines. In some cases, multiple processors 102 or multiple processing cores or engines in one or more processors 102 may be used to perform the functions 108-118 described above. This may allow, for instance, the processor(s) 102 to be used to process information and perform common tasks or different tasks in parallel.

Although FIG. 1 illustrates one example of a system 100 supporting target behavior prediction, various changes may be made to FIG. 1. For example, various functions and components shown in FIG. 1 may be combined, further subdivided, replicated, omitted, or rearranged and additional functions and components may be added according to particular needs. Also, the predicted behavior of at least one target object may be used in any suitable manner for any suitable purpose in any suitable system.

Figure 2:
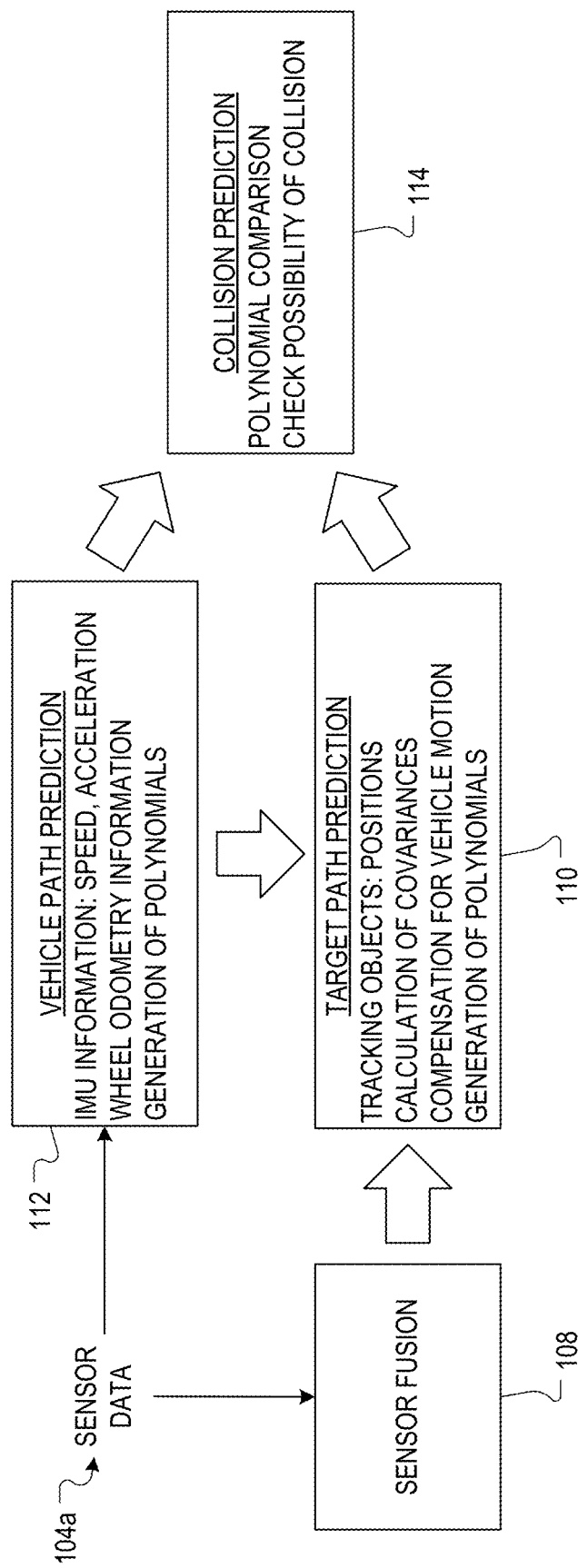
FIG. 2 illustrates example functions for target behavior prediction in the system of FIG. 1 according to this disclosure.

FIG. 2 illustrates example functions for target behavior prediction in the system 100 of FIG. 1 according to this disclosure. As shown in FIG. 2, at least some of the sensor data 104a is provided to the vehicle path prediction function 112, such as speed and acceleration/deceleration data and wheel odometry data. The vehicle path prediction function 112 here includes a polynomial generation function, which generally involves fitting a polynomial curve to the processed input data in order to define the expected future path of the vehicle 100. The vehicle path prediction function 112 may use any suitable curve-fitting technique or other approach to generate a polynomial based on information defining the operation of the vehicle 100. In some cases, the vehicle path prediction function 112 may generate a polynomial representing an expected path of the vehicle 100 using vehicle kinematics, such as in the manner described.

The sensor fusion function 108 provides combined sensor information to the target path prediction function 110. The target path prediction function 110 here includes a tracking function, which generally involves the target path prediction function 110 tracking the positions of one or more target objects relative to the vehicle 100 over time. This function can involve identifying target objects in images or other sensor data and identifying relative distances from the vehicle 100 to the identified target objects. Each of the positions may be expressed in any suitable manner, such as a distance and an angle from the vehicle 100 or as coordinates in a vehicle coordinate frame. The target path prediction function 110 here also includes a covariances calculation function, which generally involves calculating the covariance of the identified positions for each target object. The covariances can be determined as described below and may be used to help indicate whether a target object has generally steady or generally non-steady relative motion, which can affect how a polynomial representing the movement of the target object is determined. The target path prediction function 110 here further includes a vehicle motion compensation function, which generally involves controlling how polynomials for target objects having generally steady relative motion are generated based on the motion of the vehicle 100. In addition, the target path prediction function 110 here includes a polynomial generation function, which generally involves fitting a polynomial curve to the identified positions of each target object. The target path prediction function 110 may use any suitable curve-fitting technique or other approach to generate a polynomial based on identified relative positions of a target object.

The collision prediction function 114 here includes a polynomial comparison function, which generally involves the collision prediction function 114 determining whether the polynomial representing the estimated path of the vehicle 100 intersects with any polynomials representing the expected paths of the target objects. In some cases, the polynomials representing the expected paths of the target objects may be weighted combinations of multiple polynomials for each target object. Also, in some cases, the polynomials representing the expected path of the vehicle 100 may be weighted combinations of multiple polynomials for the vehicle 100. The collision prediction function 114 here also includes a collision check function, which generally involves the collision prediction function 114 determining a probability or other likelihood of a collision between the vehicle 100 and each target object. This can be based on whether the polynomial or weighted combination of polynomials representing the path of the vehicle 100 intersects with any polynomials or weighted combinations of polynomials representing the expected paths of the target objects.

Although FIG. 2 illustrates examples of functions 110, 112, 114 for target behavior prediction in the system 100 of FIG. 1, various changes may be made to FIG. 2. For example, the functions shown in FIG. 2 may be combined, further subdivided, replicated, omitted, or rearranged and additional functions may be added according to particular needs.

Figure 3:
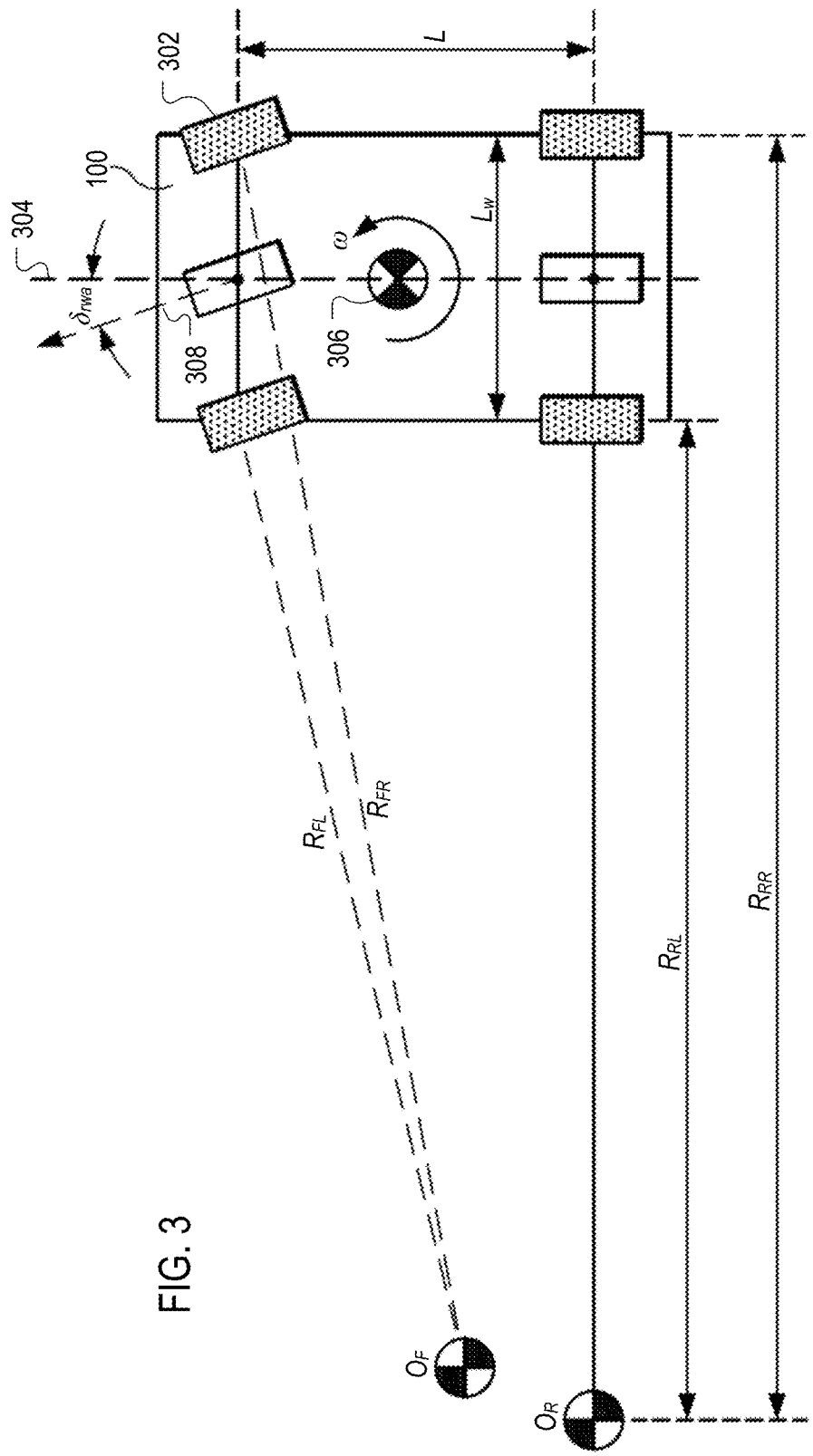
FIG. 3 illustrates an example geometry of a vehicle used during target behavior prediction according to this disclosure.

FIG. 3 illustrates an example geometry of a vehicle 100 used during target behavior prediction according to this disclosure. The example geometry of the vehicle 100 may, for example, be used by the vehicle path prediction function 112 to define vehicle kinematics. The vehicle kinematics can be used by the vehicle path prediction function 112 when estimating the future path of the vehicle 100.

As shown in FIG. 3, the vehicle 100 includes four wheels 302, including two front wheels and two rear wheels. The vehicle 100 also has a longitudinal axis 304 and a center point 306. The longitudinal axis 304 extends through a center of the vehicle 100 along the length (as measured front-to-back) of the vehicle 100. The center point 306 represents a center of gravity or pivot point of the vehicle 100 and denotes the point about which yaw can be applied to cause lateral movement (left or right movement) of the vehicle 100. In this example, L represents the wheelbase of the vehicle 100, meaning the distance between the front and rear axles of the vehicle 100. Also, $L_w$ represents the distance between left and right wheels 302 along the same axle of the vehicle 100. In addition, ω represents the yaw rate of the vehicle 100 during a turn.

Using four-wheel speed from an odometer of the vehicle 100 and the yaw rate ω of the vehicle 100, the kinematics of the vehicle may be represented as follows.

$$R_{ij} \cdot \omega = V_{ij}$$

$$\forall_{ij} = FL, FR, RL, RR$$

Here, $R_{ij}$ represents the turn radius of the vehicle 100 at each wheel 302 in the $ij^{th}$ location of the vehicle 100. That is, $R_{FL}$ represents the turn radius at the front left wheel 302, $R_{FR}$ represents the turn radius at the front right wheel 302, $R_{RL}$ represents the turn radius at the rear left wheel 302, and $R_{RR}$ represents the turn radius at the rear right wheel 302. The front wheels 302 of the vehicle 100 have a center point of instantaneous turning $O_F$, and the rear wheels 302 of the vehicle 100 have a center point of instantaneous turning $O_R$. The center points of instantaneous turning $O_F$ and $O_R$ may or may not coincide with each other depending on the circumstances.

The yaw rate ω of the vehicle 100 can often be noisy and inaccurate, such as at low speeds. To deal with this issue, the kinematics of the vehicle 100 can be modified, such as in the following manner.

$$\frac{R_i}{R_o} = \frac{V_i}{V_o} = \frac{\kappa_o}{\kappa_i}$$

Here, the subscripts i and o indicate inner and outer wheels 302 of the same axle during turning, and κ represents the corresponding curvature. Based on the fact that the distance difference between the inner and outer radii ($R_i$ and $R_o$) is the distance $L_w$ between the wheels 302 along the same axle the following can be obtained.

$$R_i = R_o \frac{V_i}{V_o} = (R_i + L_w)\frac{V_i}{V_o} \rightarrow R_i = \frac{L_w \cdot V_i}{V_o - V_i} \text{ and}$$

$$R_o = \frac{L_w \cdot V_o}{V_o - V_i} \rightarrow R = \frac{1}{2}(R_i + R_o) = \frac{L_w \cdot (V_o + V_i)}{V_o - V_i}$$

Assuming κ=1/R represents the curvature of radius at turn for the same axle, the following can be obtained.

$$\kappa = \frac{V_o - V_i}{L_w \cdot (V_o + V_i)}$$

Note that the effect of the vehicle's yaw rate ω is not reflected here, but the difference wheel speed only affects the calculation of curvature. The denominator of $(V_o+V_i)$ should not be zero to avoid the divergence of curvature, which means that the vehicle 100 is at stop, so the curvature may not be provided when the vehicle speed is zero. When the numerator $(V_o-V_i)$ goes near zero during a non-stopping maneuver (meaning $V_o+V_i \ne 0$), the curvature also goes to zero, which means that the vehicle 100 is performing a straight maneuver. For the front and rear axles, the two curvatures of radius can be calculated in the same way as above, which can result in the following being obtained.

$$K_{front} = \frac{V_{FR} - V_{FL}}{L_w \cdot (V_{FR} + V_{FL})}$$

$$\kappa_{rear} = \frac{V_{RR} - V_{RL}}{L_w \cdot (V_{RR} + V_{RL})}$$

In terms of merging the two curvatures from the front and rear axles, based on the powertrain configuration, a driving wheel 302 can be located at the front or rear axle. The driving wheel is usually affected by wheel slip on a slippery road and by sudden acceleration/deceleration or braking scenarios. It is therefore possible to reduce the wheel slip effect based on an index of longitudinal acceleration, such as in the following manner.

$$\kappa_{final} = \alpha \cdot \kappa_{driving} + (1-\alpha) \cdot \kappa_{non-driving}$$

Figure 4:
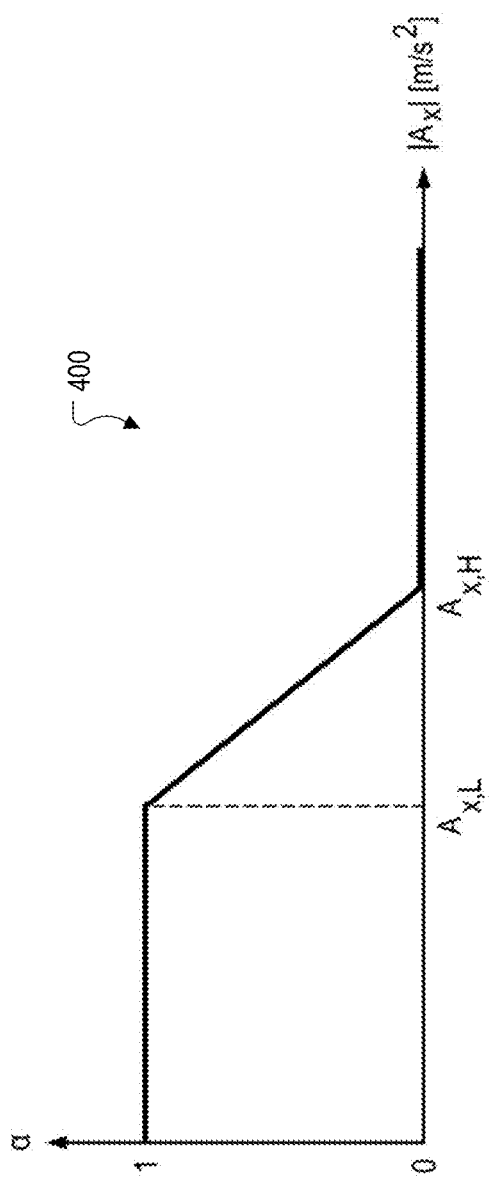
FIG. 4 illustrates an example weighting based on longitudinal acceleration used during target behavior prediction according to this disclosure.

Here, α represents a varying weight according to the longitudinal acceleration $A_x$, which is used to reduce the effect of wheel-slip. Also, $\kappa_{driving}$ and $\kappa_{non-driving}$ may represent $\kappa_{rear}$ and $\kappa_{front}$, respectively, in a rear-driving powertrain configuration. FIG. 4 illustrates an example weighting based on longitudinal acceleration used during target behavior prediction according to this disclosure. In particular, FIG. 4 includes a graph 400 illustrating how the weight α can vary based on the longitudinal acceleration $A_x$. As shown here, the weight α can have a relatively high value (such as a value of one) for longitudinal accelerations up to a lower threshold $A_{x,L}$. Between the lower threshold $A_{x,L}$ and an upper threshold $A_{x,H}$, the weight α can decrease, such as in a linear manner. Above the upper threshold $A_{x,H}$, the weight α can have a value of zero. Note that the longitudinal acceleration $A_x$ can be filtered (such as by using a low-pass filter) prior to usage as an index for determining the value of the weight α. The thresholds $A_{x,L}$ and $A_{x,H}$ here can be used as tuning parameters for the weight. Finally, the path prediction for the vehicle 100 can be determined, such as in the following manner.

$$y_e(x) = \tfrac{1}{2}\kappa_{final} \cdot x^2$$

Here, x is positive in the forward direction of the vehicle's coordinate system, and $y_e(x)$ represents a polynomial defining the estimated path of the vehicle 100 based on its kinematics.

Although FIG. 3 illustrates one example of the geometry of a vehicle 100 used during target behavior prediction, various changes may be made to FIG. 3. For example, a vehicle may be modeled using any other geometry and kinematics suitable to that particular vehicle. Also, the estimated path of the vehicle 100 may be determined by the vehicle path prediction function 112 in any other suitable manner. Although FIG. 4 illustrates one example of a weighting based on longitudinal acceleration used during target behavior prediction, various changes may be made to FIG. 4. For instance, any other suitable weighting based on longitudinal acceleration may be used.

Figure 5:
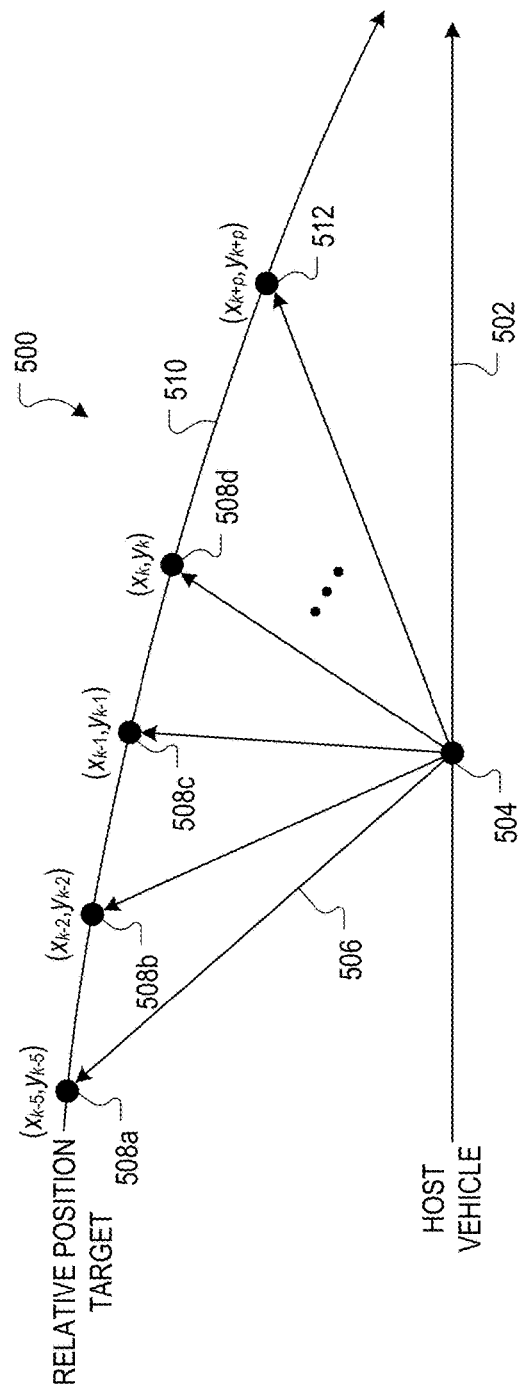
FIGS. 5 through 7 illustrate examples of performing target behavior prediction under steady and non-steady relative motions according to this disclosure.
Figure 6:
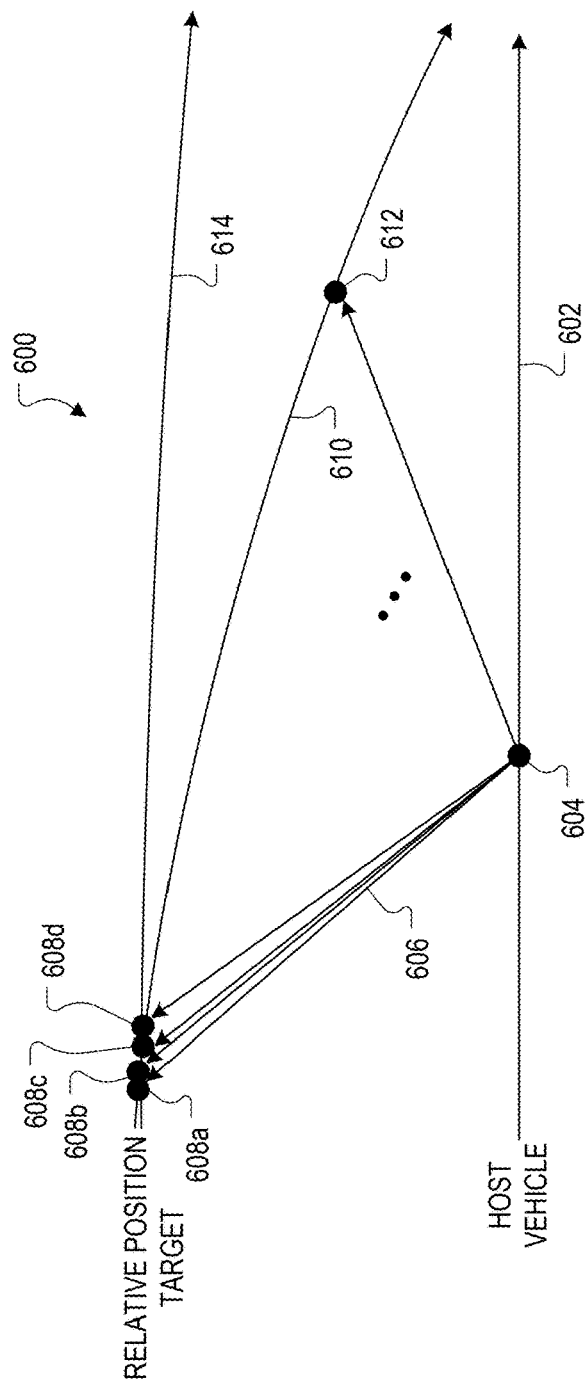
Figure 7:
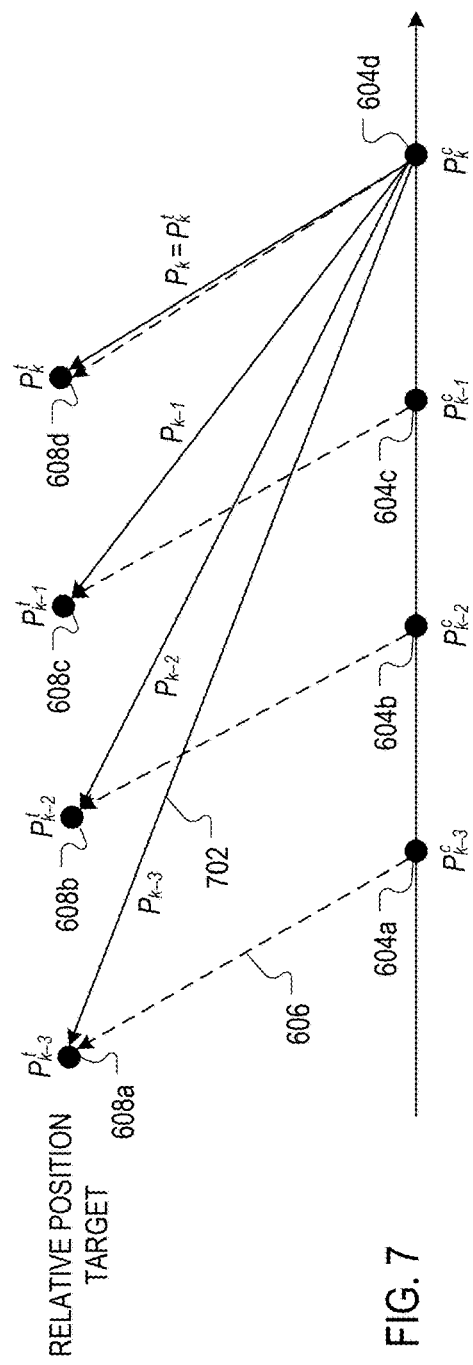

FIGS. 5 through 7 illustrate examples of performing target behavior prediction under steady and non-steady relative motions according to this disclosure. For ease of explanation, the target behavior prediction under steady and non-steady relative motions is described as being performed using the vehicle 100 of FIG. 1. However, target behavior prediction under steady or non-steady relative motion may be used in any other suitable vehicle or other system.

As shown in FIG. 5, a graph 500 plots a path 502 associated with a host vehicle (such as the vehicle 100) over time. In some cases, the path 502 may be based on the current steering or travel direction of the host vehicle and may be determined as described above based on the kinematics of the vehicle 100. The graph 500 also includes a point 504 on the path 502 that identifies a current position of the host vehicle. Vectors 506 extend from the point 504 on the path 502 to multiple points 508*a*-508*d* associated with a target object. The vectors 506 define the relative positions of the target object with respect to the host vehicle over time. In this particular example, one vector 506 defines a point 508*d* identifying the relative position of the target object with respect to the host vehicle during a current time interval (which is denoted k). Other vectors 506 define points 508*a*-508*c* identifying the relative positions of the target object with respect to the host vehicle during three previous time intervals (which are denoted k−3, k−2, and k−1).

As can be seen in the example of FIG. 5, the target object has generally non-steady motion relative to the host vehicle. That is, the direction to or the distance between the target object and the host vehicle varies significantly, which can indicate that the target object is moving closer to or farther from the host vehicle over time. In these or other situations, the points 508*a*-508*d* are relatively spaced apart, and it is therefore possible for the target path prediction function 110 to generate a polynomial that represents the actual and estimated behaviors of the target object. In some embodiments, the target path prediction function 110 may operate as follows. The set of points 508*a*-508*d* can be represented as $(x_i, y_i)$, where i=k−3, k−2, k−1, k. Thus, the points $(x_i, y_i)$ can represent the current relative position of the target object and one or more past relative positions of the target object. In this particular example, a third-order polynomial can be generated to represent these points $(x_i, y_i)$. In some cases, the third-order polynomial may be expressed as follows.

$$y_t(x) = \sum_{j=0}^{3} b_j \cdot x^j$$

Here, x represents forward distance (such as in meters) from the host vehicle's coordinate system, and $\{b_j\}$ represents a set of coefficients for the polynomial based on the points from the current time interval k to the previous time intervals to k−3. Using this polynomial, it is possible to define an estimated path 510 for the target object and to predict a future position of the target object as represented by a point 512 for a future time interval k+p. Note that while a third-order polynomial is generated here, polynomials of other orders may be generated using other numbers of points associated with relative positions of a target object.

In contrast, as shown in FIG. 6, a graph 600 plots another path 602 associated with a host vehicle (such as the vehicle 100) over time, and a point 604 on the path 602 identifies a current position of the host vehicle. Vectors 606 extend from the point 604 on the path 602 to multiple points 608a-608d associated with a target object. The vectors 606 define the relative positions of the target object with respect to the host vehicle over time. More specifically, one vector 606 defines a point 608d identifying the relative position of the target object with respect to the host vehicle during a current time interval. Other vectors 606 define points 608a-608c identifying the relative positions of the target object with respect to the host vehicle during three previous time intervals.

As can be seen in the example of FIG. 6, the target object has generally steady motion relative to the host vehicle. That is, the direction to and the distance between the target object and the host vehicle remain relatively constant, which can indicate that the target object is generally remaining at or near the same distance from the host vehicle over time. In these or other situations, the points 606a-606d are relatively close together, and it may be difficult to generate a polynomial that accurately estimates the behavior of the target object. For instance, while it may be possible to generate a polynomial that defines an estimated path 610 for the target object and to predict a future position of the target object as represented by a point 612 along the estimated path 610, another polynomial might define another (but equally valid based on the points 606a-606d) estimated path 614 and to predict a different future position of the target object relative to the host vehicle.

To allow the vehicle 100 to deal with both steady relative target motion and non-steady relative target motion, the target path prediction function 110 can generate covariance information for the relative positions identified by the points 508a-508d, 608a-608d. For example, in some embodiments, the target path prediction function 110 may generate a covariance matrix and determine a magnitude of the covariance based on the position vectors 506, 606. In some cases (like the examples shown in FIGS. 5 and 6), the covariance matrix and the magnitude of the covariance can be determined using four relative position vectors from $(x_k, y_k)$ to $(x_{k-3}, y_{k-3})$ in the following manner.

$$\Sigma = \begin{bmatrix} \sigma_{xx} & \sigma_{xy} \\ \sigma_{yx} & \sigma_{yy} \end{bmatrix}, \quad \delta = \sqrt{\sigma_{xx}^2 + \sigma_{yy}^2}$$

Here, $\Sigma$ represents the covariance matrix, and $\sigma$_represents the variance or covariance between the x elements and/or the y elements in the relative position vectors. Also, $\delta$ represents the magnitude of the covariance between the relative position vectors.

In some embodiments, a polynomial $y_t(x)$ representing a target object's estimated positions relative to the host vehicle can be generated regardless of the steady or non-steady nature of the relative target motion by using the covariance information of the tracked points. For example, a covariance threshold $\delta_{thrsh}$ may be compared to the magnitude of the covariance $\delta$ for a particular target object. If the magnitude of the covariance $\delta$ exceeds the covariance threshold $\delta_{thrsh}$, the equation above may be used to generate a polynomial $y_t(x)$, which represents the estimated behavior of that particular target object.

If the magnitude of the covariance $\delta$ does not exceed the covariance threshold $\delta_{thrsh}$, a different approach can be used to generate the polynomial for the target object. More specifically, it is possible to compensate the relative motion of the target object based on the motion of the vehicle 100. When that occurs, it is possible to generate a polynomial for the target object, even though the points 608a-608d were (originally) very close to one another. One example of this compensation is shown in FIG. 7, which illustrates how the points 608a-608d can be adjusted based on the estimated motion of the vehicle 100. In the example of FIG. 7, points 604a-604d represent estimated positions of the vehicle 100 along the path 602 of the vehicle 100 over time. For instance, point 604d may represent a current position of the vehicle 100, and points 604a-604c may represent prior positions of the vehicle 100. The notation $P_j^e$ is used to represent the positions of the vehicle 100 as the vehicle 100 moves along the path 602, and the notation $P_j^t$ is used to represent the positions of the target object (where j=k−3, k−2, k−1, and k).

It is possible to define all of the positions $P_j^t$ of the target object based on the current position $P_k^e$ of the vehicle 100, such as in the following manner.

$$P_j = P_j^e + P_j^t$$

In other words, this approach converts all of the relative positions $P_j^t$ of the target object into relative positions from the current position $P_k^e$ of the vehicle 100. Here, $P_j^t$ can be determined by using perceptual or other sensor data, and $P_j^e$ can be determined using motion prediction of the vehicle 100 in the reverse direction (such as through differential wheel odometry). Let $P_j^e = (x_j^e, y_j^e)$ be a position vector with longitudinal and lateral positions. Based on the estimated motion of the vehicle 100, the positions of the vehicle 100 can be extracted from the current time interval k to the past time intervals of k−3, k−2, and k−1. In some cases, this can be performed as follows.

$$y_{k \to k-1}^e(x) = \tfrac{1}{2} \kappa_{k-1} \cdot x^2$$

Here, x is the reverse direction (negative) and can be calculated with a sampling time and speed difference between current and previous time frames. The curvature $\kappa_{k-1}$ in some cases can be obtained using differential wheel odometry, such as in the following manner.

$$\kappa_{k-1} = \frac{V_{k,k-1}^R - V_{k,k-1}^L}{L_w \cdot (V_{k,k-1}^R + V_{k,k-1}^L)}$$

Here, $L_w$ represents the wheelbase of the vehicle 100, $V_{k,k-1}^R = V_{k-1}^R - V_k^R$ represents the wheel speed difference between the current time k and the previous time k−1 at a right wheel of the vehicle 100, and $V_{k,k-1}^L = V_{k-1}^L - V_k^L$ represents the wheel speed difference between the current time k and the previous time k−1 at a left wheel of the vehicle 100. In general, the position of the vehicle 100 from the current time interval to a prior time interval can be represented for i=k−1, k−2, and k−3, which can be expressed as follows.

$$y_{k \to i}^e(x) = \frac{1}{2} \kappa_i \cdot x^2$$

$$\kappa_i = \frac{V_{k,i}^R - V_{k,i}^L}{L_w \cdot (V_{k,i}^R + V_{k,i}^L)}$$

Effectively, this approach converts the vectors 606 associated with the prior time intervals k−1, k−2, and k−3 (which were determined relative to the prior positions of the vehicle 100) into vectors 702 that are expressed relative to the current position of the vehicle 100. Note, however, that the vectors 702 may also be defined based on another single position of the vehicle 100. As can be seen in FIG. 7, this causes the points 608a-608d to be spaced further apart compared to FIG. 6, allowing a polynomial $y_t(x)$ to be generated, such as by using the equation above. As a result, the target path prediction function 110 is able to generate polynomials for target objects under both generally steady motion relative to the vehicle 100 and under generally non-steady motion relative to the vehicle 100.

The collision prediction function 114 uses the generated polynomials in order to determine whether a collision between the vehicle 100 and any of the target objects may occur. In some embodiments, for example, the collision prediction function 114 may determine whether the polynomial representing the estimated path of the vehicle 100 intersects with any generated polynomial representing the estimated path of a target object. This can be done for each target object during each time interval, meaning the polynomial representing the current estimated path of the vehicle 100 can be compared with each polynomial representing the current estimated path of each target object. If there is an intersection, this can be indicative of a potential collision, and the distance to and time of the potential collision can be estimated based on the location of the intersection point of the polynomials.

In other embodiments, the collision prediction function 114 can generate a weighted sum of multiple polynomials for each target object as part of the process of performing collision prediction. That is, the collision prediction function 114 can apply different weights to polynomials generated for the same target object overtime, where different polynomials can be weighted differently. In some cases, the collision prediction function 114 can sum the polynomials generated for the same target object over a period of two to three seconds (although other time periods may be used). As a particular example, the accumulated set of coefficients for a weighted sum of multiple polynomials at a current time interval k may be expressed as follows.

$$\{b_j\}_k = \sum_{i=0}^{-n} w_i \cdot \{b_j\}_i$$

Here, $\{b_j\}_k$ represents the set of coefficients for a final polynomial that represents a weighted sum of multiple polynomials for a target object. Also, $w_i$ represents a weight applied to the coefficients of the $i^{th}$ polynomial, and n represents the number of previous time intervals for which polynomials are combined in the weighted sum. In some cases, n can be determined as follows.

$$n = \frac{k_p}{\Delta t}$$

Here, n is defined as the number of sampled data points for $k_p$ seconds, and $\Delta t$ is a sampling rate in seconds.

In particular embodiments, the weights $w_i$ may be defined using a sigmoid function. In these cases, the weights $w_i$ may be expressed as follows.

$$w_i = \frac{1}{1 + e^{-a_p(i - b_p)}}$$

Figure 8:
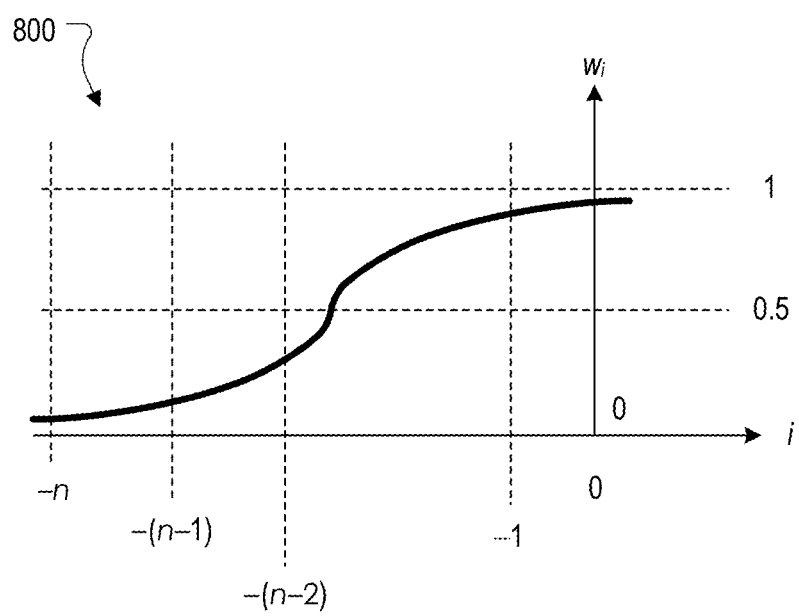
FIG. 8 illustrates an example approach for weighted summing for use during target behavior prediction according to this disclosure.

Here, $a_p$ and $b_p$ may represent tuning parameters used to define the sigmoid weight function, where $a_p > 0$ and $b_p < 0$. In some instances, these tuning parameters may be used to center the weight function at or near the middle of previously-sampled position points defining the relative positions of the target object. FIG. 8 illustrates an example approach for weighted summing for use during target behavior prediction according to this disclosure. In FIG. 8, a graph 800 plots the weight values $w_i$ that may be applied to polynomial coefficients when generating a weighted combination. In this example, the weight values have the form of a sigmoid function, where newer polynomial coefficients are weighted more heavily than older polynomial coefficients and where the weights rapid change in a middle portion of the function.

Once a final polynomial for a target object is generated using a weighted combination of the multiple polynomials for that target object, the collision prediction function 114 can estimate whether collision between the vehicle 100 and the target object is likely or probable. For example, the collision prediction function 114 may determine whether the polynomial representing the estimated path of the vehicle 100 intersects with any generated weighted combination of polynomials representing the estimated path of a target object. This can be done for each target object during each time interval, meaning the polynomial representing the current estimated path of the vehicle 100 can be compared with each weighted combination of polynomials representing the current estimated path of each target object. If there is an intersection, this can be indicative of a potential collision, and the distance to and time of the potential collision can be estimated based on the location of the intersection point of the polynomials.

Note that a weighted sum of polynomials may also be used for the vehicle 100 itself. That is, multiple polynomials representing the estimated path of the vehicle 100 may be generated over time, and the multiple polynomials representing the estimated path of the vehicle 100 can be combined in a weighted sum (such as by using the same approach described above). In these cases, a similar weight function as the one shown in FIG. 8 might be used to weight the polynomials associated with the vehicle 100. If a weighted sum of the polynomials for the vehicle 100 is generated, this weighted sum may be compared to the individual polynomials for each target object or to the weighted sum of the polynomials for each target object in order to determine whether a collision is possible.

In some embodiments, the collision prediction function 114 may compare coefficients of different polynomials and/or different weighted combinations of polynomials before calculating the intersection point (if any) between pairs of polynomials and/or weighted combinations of polynomials. This may allow, for instance, the collision prediction function 114 to narrow down which polynomials or weighted combinations of polynomials for target objects are processed to determine if there is any intersection with the polynomial or weighted combination of polynomials for the vehicle 100. For example, the $b_0$ coefficient of a polynomial or weighted combination of polynomials associated with a target object generally corresponds to a lateral displacement of the target object with respect to the vehicle 100. This can be useful in determining whether a target object is close to the vehicle 100. Also, the $b_2$ coefficient of a polynomial or weighted combination of polynomials associated with a target object generally corresponds to the curvature of the target object's path (which may be generally straight or towards or away from the travel direction of the vehicle 100). The curvature of the target object's path can be compared to the predicted curvature of the path of the vehicle 100 so that the directions of the two paths can be determined and their convergence/divergence can be identified. If the two paths are converging, this can be indicative of a potential collision, and the distance to and time of the potential collision can be estimated based on the location of the intersection point of the polynomials.

Although FIGS. 5 through 7 illustrate examples of performing target behavior prediction under steady and non-steady relative motions, various changes may be made to FIGS. 5 through 7. For example, the steady and non-steady relative motions shown in FIGS. 5 through 7 are examples only and can easily vary depending on the circumstances. Although FIG. 8 illustrates one example of an approach for weighted summing for use during target behavior prediction, various changes may be made to FIG. 8. For instance, any suitable weighting function may be used and may be dynamic in some implementations.

Figure 9:
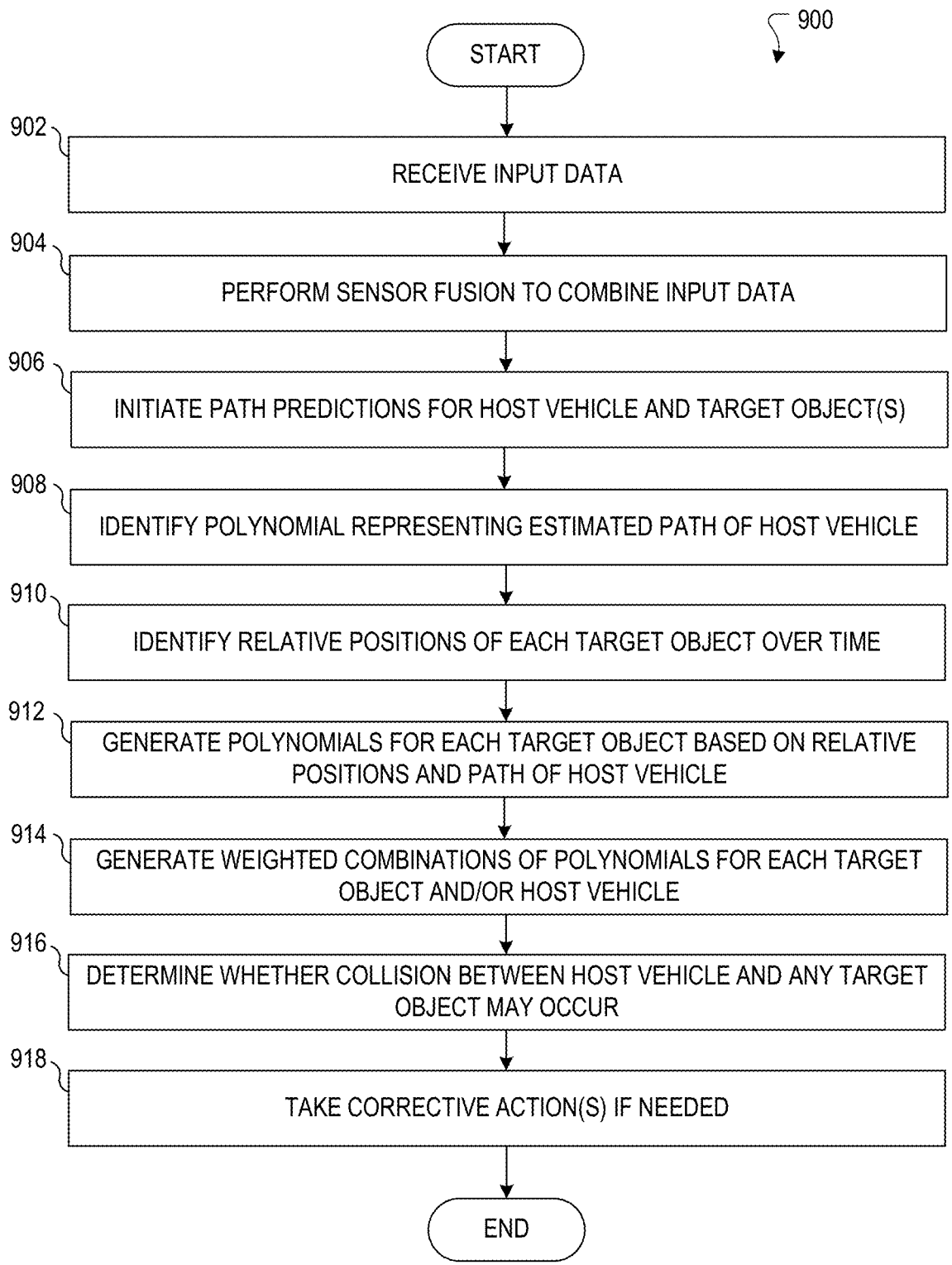
FIG. 9 illustrates an example method for target behavior prediction according to this disclosure.

FIG. 9 illustrates an example method 900 for target behavior prediction according to this disclosure. For ease of explanation, the method 900 is described as being performed using the vehicle 100 of FIG. 1. However, the method 900 may be performed using any other suitable vehicle or other system.

As shown in FIG. 9, input data is received at step 902. This may include, for example, the processor 102 of a host vehicle 100 obtaining images or other sensor data from one or more sensors 104 of the vehicle 100. Sensor fusion may optionally be performed to combine the input data at step 904. This may include, for example, the processor 102 of the vehicle 100 performing the sensor fusion function 108 to identify vehicles, obstacles, or people in images or other sensor data. This may also include the processor 102 of the vehicle 100 performing the sensor fusion function 108 to aggregate the sensor data for each detected object from multiple sensors 104.

Path prediction for the host vehicle and one or more target objects is initiated at step 906. This may include, for example, the processor 102 of the vehicle 100 providing sensor data for the vehicle 100 to the vehicle path prediction function 112 and providing sensor data for one or more target objects to the target path prediction function 110. The one or more target objects may be identified in any suitable manner, such as by identifying the one or more detected objects that are closest to or within a specified distance of the vehicle 100. A polynomial representing an estimate path of the host vehicle is identified at step 908. This may include, for example, the processor 102 of the vehicle 100 performing the vehicle path prediction function 112 to estimate a path of the vehicle 100 based on speed, acceleration/deceleration, and wheel odometry information associated with the vehicle 100. A polynomial for the vehicle 100 can be generated during each of multiple time intervals.

Relative positions of each target object with respect to the host vehicle are determined over time at step 910. This may include, for example, the processor 102 of the vehicle 100 performing the target path prediction function 110 to identify a position vector, coordinates, or other location information that defines the location of each target object relative to the vehicle 100 during different time intervals. Polynomials for each target object are generated based on the relative positions and optionally the identified path of the host vehicle at step 912. This may include, for example, the processor 102 of the vehicle 100 performing the target path prediction function 110 to identify a covariance matrix $\Sigma$ and a magnitude of the covariance $\delta$ between the relative positions of each target object. If the magnitude of the covariance $\delta$ for a target object exceeds a covariance threshold $\delta_{thrsh}$, the processor 102 of the vehicle 100 can generate a polynomial $y_t(x)$ using the equation above based on the relative positions of the target object. If the magnitude of the covariance $\delta$ for a target object does not exceed the covariance threshold $\delta_{thrsh}$, the processor 102 of the vehicle 100 can generate a polynomial $y_t(x)$ by modifying the relative positions of the target object based on the estimated path of the vehicle 100, such as by using the approach shown in FIG. 7, in order to express the relative positions of the target object based on the current location of the vehicle 100. The processor 102 of the vehicle 100 can generate a polynomial $y_t(x)$ using the equation above based on the modified relative positions of the target object. A polynomial for each target object can be generated during each of multiple time intervals.

A weighted combination of the polynomials for each target object and/or a weighted combination of the polynomials for the host vehicle may optionally be generated at step 914. This may include, for example, the processor 102 of the vehicle 100 performing the collision prediction function 114 to identify weights $w_i$ for different polynomials of each target object or the vehicle 100 and applying those weights $w_i$ to the coefficients of those polynomials for each target object or the vehicle 100.

A determination is made whether a collision between the host vehicle and any target object might occur at step 916. This may include, for example, the processor 102 of the vehicle 100 performing the collision prediction function 114 to identify whether the polynomials and/or weighted combinations of polynomials associated with the vehicle 100 and a target object intersect. Prior to determining an intersection, the processor 102 of the vehicle 100 may determine whether the $b_0$ coefficient in any polynomial or weighted combination of polynomials for a target object indicates that a lateral displacement between the vehicle 100 and the target object is falling below a threshold distance. The processor 102 of the vehicle 100 may also or alternatively identify whether the $b_2$ coefficient in any polynomial or weighted combination of polynomials for a target object indicates that the curvature of the target object's path is converging towards the path of the vehicle 100. If a collision is possible/probable/likely, one or more corrective actions may occur at step 918. This may include, for example, the processor 102 of the vehicle 100 using the decision planning function 116 and motion control function 118 to initiate a change to a speed or acceleration/deceleration of the vehicle 202 and/or to initiate emergency braking, evasion steering, collision warning, or other action(s).

Although FIG. 9 illustrates one example of a method 900 for target behavior prediction, various changes may be made to FIG. 9. For example, while shown as a series of steps, various steps in FIG. 9 may overlap, occur in parallel, occur in a different order, or occur any number of times. As a particular example, various target objects may be identified over time, different polynomials for each target object and the vehicle 100 may be generated over time, and different polynomials or weighted combinations of polynomials for each target object and the vehicle 100 may be used for collision detection. Thus, it is possible for some or all steps of the method 900 to occur in an overlapping or parallel manner to support continuous behavior prediction and collision monitoring.

Note that many functional aspects of the embodiments described above can be implemented using any suitable hardware or any suitable combination of hardware and software/firmware instructions. In some embodiments, at least some functional aspects of the embodiments described above can be embodied as software instructions that are executed by one or more unitary or multi-core central processing units or other processing device(s). In other embodiments, at least some functional aspects of the embodiments described above can be embodied using one or more application specific integrated circuits (ASICs). When implemented using one or more ASICs, any suitable integrated circuit design and manufacturing techniques may be used, such as those that can be automated using electronic design automation (EDA) tools. Examples of such tools include tools provided by SYNOPSYS, INC., CADENCE DESIGN SYSTEMS, INC., and SIEMENS EDA.

Figure 10:
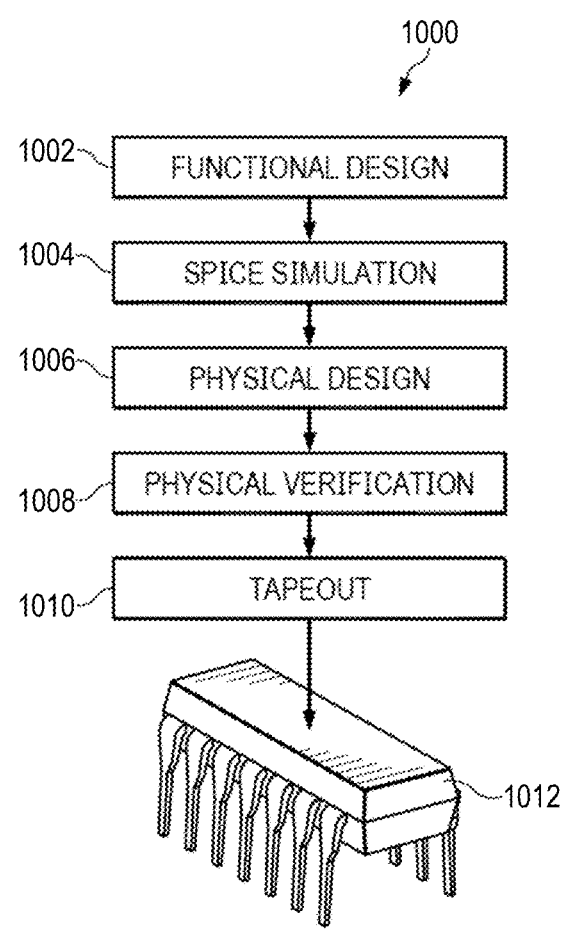
FIG. 10 illustrates an example design flow for employing one or more tools to design hardware that implements one or more functions according to this disclosure.

FIG. 10 illustrates an example design flow 1000 for employing one or more tools to design hardware that implements one or more functions according to this disclosure. More specifically, the design flow 1000 here represents a simplified ASIC design flow employing one or more EDA tools or other tools for designing and facilitating fabrication of ASICs that implement at least some functional aspects of the various embodiments described above.

As shown in FIG. 10, a functional design of an ASIC is created at step 1002. For any portion of the ASIC design that is digital in nature, in some cases, this may include expressing the digital functional design by generating register transfer level (RTL) code in a hardware descriptive language (HDL), such as VHDL or VERILOG. A functional verification (such as a behavioral simulation) can be performed on HDL data structures to ensure that the RTL code that has been generated is in accordance with logic specifications. In other cases, a schematic of digital logic can be captured and used, such as through the use of a schematic capture program. For any portion of the ASIC design that is analog in nature, this may include expressing the analog functional design by generating a schematic, such as through the use of a schematic capture program. The output of the schematic capture program can be converted (synthesized), such as into gate/transistor level netlist data structures. Data structures or other aspects of the functional design are simulated, such as by using a simulation program with integrated circuits emphasis (SPICE), at step 1004. This may include, for example, using the SPICE simulations or other simulations to verify that the functional design of the ASIC performs as expected.

A physical design of the ASIC is created based on the validated data structures and other aspects of the functional design at step 1006. This may include, for example, instantiating the validated data structures with their geometric representations. In some embodiments, creating a physical layout includes "floor-planning," where gross regions of an integrated circuit chip are assigned and input/output (I/O) pins are defined. Also, hard cores (such as arrays, analog blocks, inductors, etc.) can be placed within the gross regions based on design constraints (such as trace lengths, timing, etc.). Clock wiring, which is commonly referred to or implemented as clock trees, can be placed within the integrated circuit chip, and connections between gates/analog blocks can be routed within the integrated circuit chip. When all elements have been placed, a global and detailed routing can be performed to connect all of the elements together. Post-wiring optimization may be performed to improve performance (such as timing closure), noise (such as signal integrity), and yield. The physical layout can also be modified where possible while maintaining compliance with design rules that are set by a captive, external, or other semiconductor manufacturing foundry of choice, which can make the ASIC more efficient to produce in bulk. Example modifications may include adding extra vias or dummy metal/diffusion/poly layers.

The physical design is verified at step 1008. This may include, for example, performing design rule checking (DRC) to determine whether the physical layout of the ASIC satisfies a series of recommended parameters, such as design rules of the foundry. In some cases, the design rules represent a series of parameters provided by the foundry that are specific to a particular semiconductor manufacturing process. As particular examples, the design rules may specify certain geometric and connectivity restrictions to ensure sufficient margins to account for variability in semiconductor manufacturing processes or to ensure that the ASICs work correctly. Also, in some cases, a layout versus schematic (LVS) check can be performed to verify that the physical layout corresponds to the original schematic or circuit diagram of the design. In addition, a complete simulation may be performed to ensure that the physical layout phase is properly done.

After the physical layout is verified, mask generation design data is generated at step 1010. This may include, for example, generating mask generation design data for use in creating photomasks to be used during ASIC fabrication. The mask generation design data may have any suitable form, such as GDSII data structures. This step may be said to represent a "tape-out" for preparation of the photomasks. The GDSII data structures or other mask generation design data can be transferred through a communications medium (such as via a storage device or over a network) from a circuit designer or other party to a photomask supplier/maker or to the semiconductor foundry itself. The photomasks can be created and used to fabricate ASIC devices at step 1012.

Although FIG. 10 illustrates one example of a design flow 1000 for employing one or more tools to design hardware that implements one or more functions, various changes may be made to FIG. 10. For example, at least some functional aspects of the various embodiments described above may be implemented in any other suitable manner.

Figure 11:
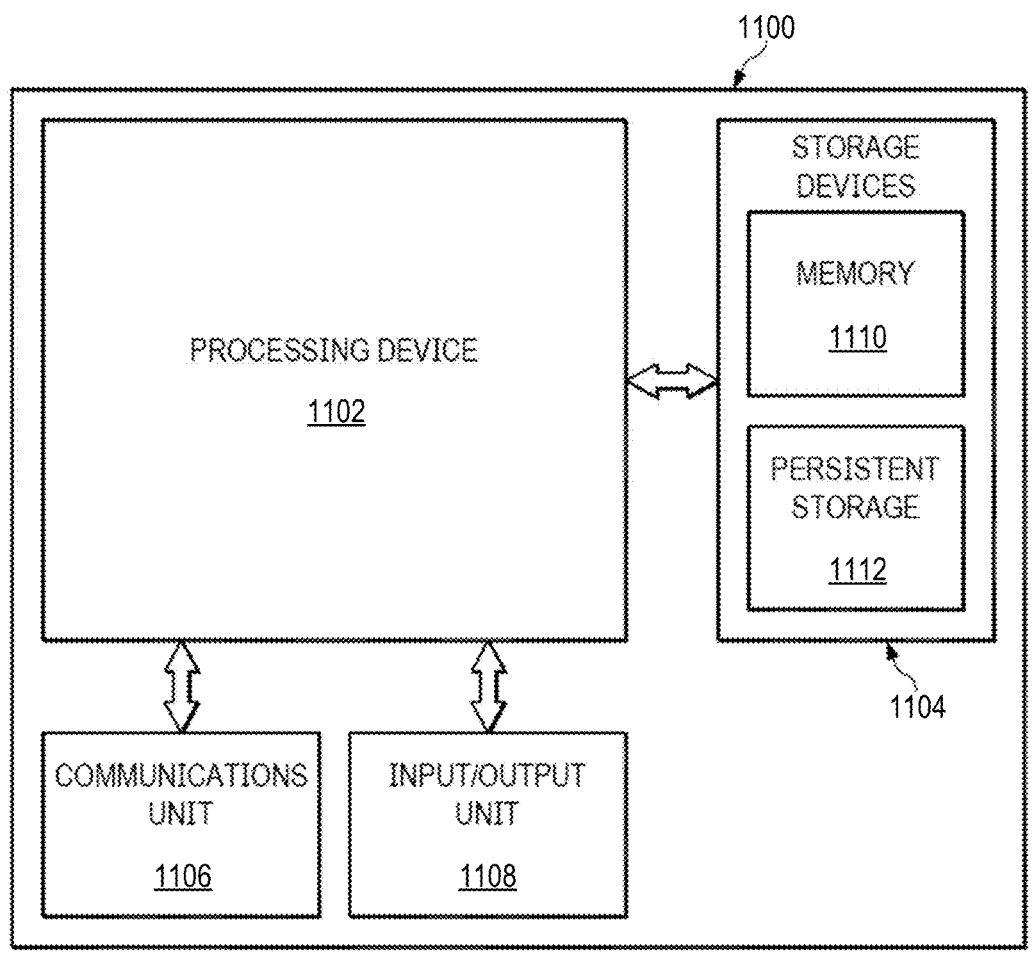
FIG. 11 illustrates an example device supporting execution of one or more tools to design hardware that implements one or more functions according to this disclosure.

FIG. 11 illustrates an example device 1100 supporting execution of one or more tools to design hardware that implements one or more functions according to this disclosure. The device 1100 may, for example, be used to implement at least part of the design flow 1000 shown in FIG. 10. However, the design flow 1000 may be implemented in any other suitable manner.

As shown in FIG. 11, the device 1100 denotes a computing device or system that includes at least one processing device 1102, at least one storage device 1104, at least one communications unit 1106, and at least one input/output (I/O) unit 1108. The processing device 1102 may execute instructions that can be loaded into a memory 1110. The processing device 1102 includes any suitable number(s) and type(s) of processors or other processing devices in any suitable arrangement. Example types of processing devices 1102 include one or more microprocessors, microcontrollers, DSPs, ASICs, FPGAs, or discrete circuitry.

The memory 1110 and a persistent storage 1112 are examples of storage devices 1104, which represent any structure(s) capable of storing and facilitating retrieval of information (such as data, program code, and/or other suitable information on a temporary or permanent basis). The memory 1110 may represent a random access memory or any other suitable volatile or non-volatile storage device(s). The persistent storage 1112 may contain one or more components or devices supporting longer-term storage of data, such as a read only memory, hard drive, Flash memory, or optical disc.

The communications unit 1106 supports communications with other systems or devices. For example, the communications unit 1106 can include a network interface card or a wireless transceiver facilitating communications over a wired or wireless network. The communications unit 1106 may support communications through any suitable physical or wireless communication link(s).

The I/O unit 1108 allows for input and output of data. For example, the I/O unit 1108 may provide a connection for user input through a keyboard, mouse, keypad, touchscreen, or other suitable input device. The I/O unit 1108 may also send output to a display or other suitable output device. Note, however, that the I/O unit 1108 may be omitted if the device 1100 does not require local I/O, such as when the device 1100 represents a server or other device that can be accessed remotely.

The instructions that are executed by the processing device 1102 include instructions that implement at least part of the design flow 1000. For example, the instructions that are executed by the processing device 1102 may cause the processing device 1102 to generate or otherwise obtain functional designs, perform simulations, generate physical designs, verify physical designs, perform tape-outs, or create/use photomasks (or any combination of these functions). As a result, the instructions that are executed by the processing device 1102 support the design and fabrication of ASIC devices or other devices that implement one or more functions described above.

Although FIG. 11 illustrates one example of a device 1100 supporting execution of one or more tools to design hardware that implements one or more functions, various changes may be made to FIG. 11. For example, computing and communication devices and systems come in a wide variety of configurations, and FIG. 11 does not limit this disclosure to any particular computing or communication device or system.

In some embodiments, various functions described in this patent document are implemented or supported using machine-readable instructions that are stored on a non-transitory machine-readable medium. The phrase "machine-readable instructions" includes any type of instructions, including source code, object code, and executable code. The phrase "non-transitory machine-readable medium" includes any type of medium capable of being accessed by one or more processing devices or other devices, such as a read only memory (ROM), a random access memory (RAM), a Flash memory, a hard disk drive (HDD), or any other type of memory. A "non-transitory" medium excludes wired, wireless, optical, or other communication links that transport transitory electrical or other signals. Non-transitory media include media where data can be permanently stored and media where data can be stored and later overwritten.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 116(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 116(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of determining a possibility of a collision between a host vehicle and a target object, the method comprising:

using at least one processing device coupled to a communications bus within the host vehicle to communicate with a plurality of sensors coupled to the communications bus to obtain sensor data from each of the plurality of sensors, the sensor data-associated with the target object at the host vehicle, perform a sensor fusion function to combine the sensor data from the plurality of sensors, operate a vehicle path prediction function based upon the sensor data to predict a future path of the host vehicle by generating at least one first polynomial associated with the host vehicle, wherein each first polynomial is a representation of an estimated behavior of the host vehicle, and identifying relative positions of the target object with reference to the host vehicle over time, operate a target path prediction function based upon the combined sensor data to estimate a position of the target object relative to the host vehicle by generating at least one second polynomial associated with the target object based on the relative positions of the target object, wherein coefficients of each second polynomial are based on a magnitude of a covariance of the relative positions of the target object used to generate the second polynomial, and wherein each second polynomial is a representation of an estimated behavior of the target object, for each second polynomial being generated, comparing the magnitude of the covariance to a covariance threshold in order to determine how the coefficients of the second polynomial are determined determine whether a collision between the host vehicle and the target object is possible based on the predicted future path of the host vehicle and the estimated position of the target object relative to the host vehicle and in response to determining that the collision between the host vehicle and the target object is possible, selectively operate at least one actuator coupled to the vehicle data bus to initiate one or more corrective actions by the host vehicle.

2. The method of claim 1, further comprising, for each second polynomial being generated:

generating a covariance matrix based on the relative positions of the target object used to generate the second polynomial; and generating the magnitude of the covariance of the relative positions of the target object used to generate the second polynomial based on the covariance matrix.

3. The method of claim 2 wherein:

the coefficients of the second polynomial are determined based on the relative positions of the target object with reference to different positions of the host vehicle over time when the magnitude of the covariance is above the covariance threshold; and the coefficients of the second polynomial are determined based on the relative positions of the target object with reference to a single position of the host vehicle when the magnitude of the covariance is below the covariance threshold.

4. The method of claim 1, further comprising using the at least one processing device for at least one of:

generating a weighted combination of multiple first polynomials associated with the host vehicle; and generating a weighted combination of multiple second polynomials associated with the target object, wherein determining whether the collision is possible comprises using at least one of: the weighted combination of the first polynomials and the weighted combination of the second polynomials.

5. The method of claim 4, wherein at least one weighted combination of polynomials is generated using weights defined by a sigmoid function.

6. The method of claim 1, wherein the one or more corrective actions comprise at least one of:

adjusting at least one of a steering of the host vehicle, a speed of the host vehicle, and a braking of the host vehicle; and activating an audible, visible, or haptic warning.

7. The method of claim 1, further comprising using the at least one processing device for repeatedly:

generating the at least one first polynomial for the host vehicle over time and generating the at least one second polynomial for the target object over time; and determining whether the collision between the host vehicle and the target object is possible based on the first and second polynomials over time.

8. The method of claim 1, further comprising using the at least one processing device for repeatedly:

generating the at least one first polynomial for the host vehicle over time and generating multiple second polynomials for multiple target objects over time; and determining whether the collision between the host vehicle and any of the target objects is possible based on the first and second polynomials over time.

9. An apparatus comprising:

at least one processing device coupled to a communications bus within a host vehicle, the at least one processing device configured to:

communicate with a plurality of sensors coupled to the communications bus to obtain sensor data from each of the plurality of sensors, the sensor data associated with a target object at the host vehicle;

perform a sensor fusion function to combine the sensor data from the plurality of sensors;

operate a vehicle path prediction function based upon the sensor data to predict a future path of the host vehicle by generating at least one first polynomial associated with the host vehicle, wherein each first polynomial is a representation of an estimated behavior of the host vehicle, and identifying relative positions of the target object with reference to the host vehicle over time;

operate a target path prediction function based upon the combined sensor data to estimate a position of the target object relative to the host vehicle by generating at least one second polynomial associated with the target object based on the relative positions of the target object, wherein coefficients of each second polynomial are based on a magnitude of a covariance of the relative positions of the target object used to generate the second polynomial, and wherein each second polynomial is a representation of an estimated behavior of the target object;

for each second polynomial being generated, comparing the magnitude of the covariance to a covariance threshold in order to determine how the coefficients of the second polynomial are determined;

determine whether a collision between the host vehicle and the target object is possible based on the predicted future path of the host vehicle and the estimated position of the target object relative to the host vehicle; and in response to determining that the collision between the host vehicle and the target object is possible, selectively operate at least one actuator coupled to the vehicle data bus to initiate one or more corrective actions by the host vehicle.

10. The apparatus of claim 9, wherein the at least one processing device is further
configured, for each second polynomial being generated, to:
generate a covariance matrix based on the relative positions of the target object used to generate the second polynomial; and
generate the magnitude of the covariance of the relative positions of the target object used to generate the second polynomial based on the covariance matrix.

11. The apparatus of claim 10, wherein:
the at least one processing device is configured to determine the coefficients of the second polynomial based on the relative positions of the target object with reference to different positions of the host vehicle over time when the magnitude of the covariance is above the covariance threshold; and
the at least one processing device is configured to determine the coefficients of the second polynomial based on the relative positions of the target object with reference to a single position of the host vehicle when the magnitude of the covariance is below the covariance threshold.

12. The apparatus of claim 9, wherein the at least one processing device is further configured to at least one of:
generate a weighted combination of multiple first polynomials associated with the host vehicle;
generate a weighted combination of multiple second polynomials associated with the target object; and
wherein the at least one processing device is configured to determine whether the collision is possible using at least one of the weighted combination of the first polynomials and the weighted combination of the second polynomials.

13. The apparatus of claim 12, wherein the at least one processing device is configured to generate at least one weighted combination of polynomials using weights defined by a sigmoid function.

14. The apparatus of claim 9, wherein one or more corrective actions comprise at least one of:
adjusting at least one of a steering of the host vehicle, speed of the host vehicle, and a braking of the host vehicle; and
activating an audible, visible, or haptic warning.

15. The apparatus of claim 9, wherein the at least one processing device is further configured to repeatedly:
generate the at least one first polynomial for the host vehicle over time and generate the at least one second polynomial for the target object over time; and
determine whether the collision between the host vehicle and the target object is possible based on the first and second polynomials over time.

16. The apparatus of claim 9, wherein the at least one processing device is further configured to repeatedly:
generate the at least one first polynomial for the host vehicle over time and generate multiple second polynomials for multiple target objects over time; and
determine whether the collision between the host vehicle and any of the target objects is possible based on the first and second polynomials over time.

17. A non-transitory machine-readable medium containing instructions that when executed cause at least one processing device coupled to a data communications bus within a host vehicle to:
communicate with a plurality of sensors coupled to the data communications bus to obtain sensor data from each of the plurality of sensors, the sensor data associated with a target object;
perform a sensor fusion function to combine the sensor data from the plurality of sensors;
operate a vehicle path prediction function based upon the sensor data to predict a future path of the host vehicle by
generating at least one first polynomial associated with the host vehicle, wherein each first polynomial is a representation of an estimated behavior of the host vehicle, and
identifying relative positions of the target object with reference to the host vehicle over time;
operate a target path prediction function based upon the combined sensor data to estimate a position of the target object relative to the host vehicle by
generating at least one second polynomial associated with the target object based on the relative positions of the target object, wherein coefficients of each second polynomial are based on a magnitude of a covariance of the relative positions of the target object used to generate the second polynomial, and wherein each second polynomial is a representation of an estimated behavior of the target object,
for each second polynomial being generated, comparing the magnitude of the covariance to a covariance threshold in order to determine how the coefficients of the second polynomial are determined;
determine whether a collision between the host vehicle and the target object is possible based on the predicted future path of the host vehicle and the estimated position of the target object relative to the host vehicle first and second-polynomials; and
in response to determining that the collision between the host vehicle and the target object is possible, selectively operate at least one actuator coupled to the vehicle data bus to initiate one or more corrective actions by the host vehicle.

18. The non-transitory machine-readable medium of claim 17, further containing instructions that when executed cause the at least one processing device, for each second polynomial being generated, to:
generate a covariance matrix based on the relative positions of the target object used to generate the second polynomial; and
generate the magnitude of the covariance of the relative positions of the target object used to generate the second polynomial based on the covariance matrix.

19. The non-transitory machine-readable medium of claim 18, wherein:
the instructions when executed cause the at least one processing device to determine the coefficients of the second polynomial based on the relative positions of the target object with reference to different positions of the host vehicle over time when the magnitude of the covariance is above the covariance threshold; and
the instructions when executed cause the at least one processing device to determine the coefficients of the second polynomial based on the relative positions of the target object with reference to a single position of the host vehicle when the magnitude of the covariance is below the covariance threshold.

20. The non-transitory machine-readable medium of claim 17, further containing instructions that when executed cause the at least one processing device to at least one of:

generate a weighted combination of multiple first polynomials associated with the host vehicle;

generate a weighted combination of multiple second polynomials associated with the target object; and wherein the instructions that when executed cause the at least one processing device to determine whether the collision is possible comprise:

instructions that when executed cause the at least one processing device to use at least one of the weighted combination of the first polynomials and the weighted combination of the second polynomials.

21. The non-transitory machine-readable medium of claim 20, wherein the instructions when executed cause the at least one processing device to generate at least one weighted combination of polynomials using weights defined by a sigmoid function.

22. The non-transitory machine-readable medium of claim 17, wherein the one or more collective actions comprise at least one of:

adjusting at least one of a steering of the host vehicle, a speed of the host vehicle, and a braking of the host vehicle; and activating an audible, visible, or haptic warning.

23. The non-transitory machine-readable medium of claim 17, further containing instructions that when executed cause the at least one processing device to repeatedly:

generate the at least one first polynomial for the host vehicle over time and generate the at least one second polynomial for the target object over time; and determine whether the collision between the host vehicle and the target object is possible based on the first and second polynomials over time.

24. The non-transitory machine-readable medium of claim 17, further containing instructions that when executed cause the at least one processing device to repeatedly:

generate the at least one first polynomial for the host vehicle over time and generate multiple second polynomials for multiple target objects over time; and determine whether the collision between the host vehicle and any of the target objects is possible based on the first and second polynomials over time.

* * * * *